United States Patent
Lu et al.

(10) Patent No.: US 6,757,494 B2
(45) Date of Patent: Jun. 29, 2004

(54) WAVELENGTH ROUTING IN A PHOTONIC NETWORK

(75) Inventors: Xiang Lu, Herts (GB); Alan R Briggs, Cambs (GB); Kevin Warbrick, Herts (GB)

(73) Assignee: Nortel Networks Limited, St. Laurent (CA)

( * ) Notice: Subject to any disclaimer, the term of this patent is extended or adjusted under 35 U.S.C. 154(b) by 647 days.

(21) Appl. No.: 09/747,697

(22) Filed: Dec. 22, 2000

(65) Prior Publication Data

US 2002/0080435 A1 Jun. 27, 2002

(51) Int. Cl.[7] ............................................. H04B 10/00
(52) U.S. Cl. ........................................ 398/25; 398/34
(58) Field of Search ................................ 370/238, 248, 370/252, 395.31, 395.32; 398/9, 25, 26, 27

(56) References Cited

U.S. PATENT DOCUMENTS

| | | | | |
|---|---|---|---|---|
| 4,947,459 A | * | 8/1990 | Nelson et al. ............... | 398/26 |
| 5,297,137 A | * | 3/1994 | Ofek et al. .................. | 370/403 |
| 5,754,543 A | * | 5/1998 | Seid ........................... | 370/351 |
| 5,822,301 A | * | 10/1998 | Arnold et al. ............... | 370/238 |
| 5,870,564 A | * | 2/1999 | Jensen et al. ................ | 709/241 |
| 5,991,271 A | * | 11/1999 | Jones et al. .................. | 370/252 |
| 6,370,119 B1 | * | 4/2002 | Basso et al. ................. | 370/252 |
| 6,580,537 B1 | * | 6/2003 | Chang et al. ................. | 398/79 |
| 6,650,843 B1 | * | 11/2003 | Lohr et al. ................... | 398/156 |
| 2001/0043771 A1 | * | 11/2001 | Iraschko ...................... | 385/24 |

* cited by examiner

*Primary Examiner*—Leslie Pascal
*Assistant Examiner*—Agustin Bello
(74) *Attorney, Agent, or Firm*—Barnes & Thornburg LLP

(57) ABSTRACT

In a photonic network, signals are degraded by passing through amplifiers. A maximum number of amplifiers may be traversed before regeneration is necessary. Regeneration (typically carried out in an optical cross-connect) involves relatively expensive hardware and is to be avoided if possible. An algorithm is set out which operates in two stages. In a first stage untenable paths are rejected and in a second stage the shortest path analyzes are carried out which maximizes the number of amplifiers interspersed between regenerative nodes thereby to minimize the use of regenerative nodes but ensures that all paths have regenerative nodes spaced at no more than a maximum interval of non-regenerative nodes.

14 Claims, 2 Drawing Sheets

WAVELENGTH ROUTING IN A PHOTONIC NETWORK

FIELD OF THE INVENTION

This invention relates to methods and apparatus for routing wavelengths in a photonic network.

BACKGROUND OF THE INVENTION

In any optical or photonic network it may be expected that signal degradation occurs as signals are passed through nodes in the network. This is because in contrast to a conventional (non-optical) network, signals may be routed using entirely optical means and therefore do not necessarily undergo regeneration at each network node. Generally speaking, the degradation is correlated to the number of nodes which the signal has passed through. For example, in a photonic network a wavelength typically may be permitted to pass through a predetermined maximum number of amplifiers before the noise added at each amplifier becomes unacceptably high. Therefore in order to permit the use of long paths with many nodes, it is necessary to periodically regenerate the signal to maintain an adequate signal quality (specified for example in terms of an acceptable bit error rate [BER] or noise floor).

In the case of a wavelength division multiplexed (WDM) arrangement, regeneration typically takes the form of an optical-electrical-optical (OEO) conversion. Thus, in routing a path through a photonic network carrying such multiplexed wavelengths, it is necessary to provision regenerative nodes at suitable intervals along the path. However, it will be noted that a node (such as an optical cross connect [OXC]) carries an additional cost over that of a simpler, optically transparent photonic cross connect (PXC) or an amplifier. Thus It is desirable to minimise the use of regenerative nodes in any cone path in order to reduce overall network costs.

Thus in principle, it is desirable to cause each path through the network to traverse as many amplifiers as possible before being regenerated (in order to reduce the number of regenerative nodes required) but to ensure that no path is allowed to traverse mote than a predetermined maximum number of amplifiers (that number being selected to ensure that the signal is not excessively degraded before regeneration).

In practice, selecting such paths particularly in a mesh network with many routing choices, is very complex.

Algorithms have been developed which are suitable for use in a centralised planning arrangement where network configuration is controlled centrally and is only periodically altered. However, it is desirable to provide an agile dynamic deployment of wavelengths across a photonic network and prior art algorithms are too cumbersome for such uses.

SUMMARY OF THE INVENTION

In accordance with a first aspect, the invention may provide a network configuration tool for a photonic network comprising a route generator operable to generate a list of possible paths through the network between a first and second node in the network, an non-regenerative node counter operable to determine for each of the possible paths whether the respective path traverses a number of non-regenerative nodes which is greater than a predetermined maximum number of non-regenerative nodes, a non-regenerative path selector operable to select a path from the set of paths which have been determined not to traverse a number of non-regenerative nodes which is greater than the said maximum number of non-regenerative nodes, and to output the selected path, a path rejecter operable to reject any paths which are determined to traverse a number of non-regenerative nodes which is greater than the said maximum non-regenerative node value and which do not traverse regenerative nodes, a Path shortener operable to generate for each possible path, a set of shortened paths, each shortened path passing between the said first node and a regenerative node in the respective possible path, the non-regenerative node counter being further operable to determine for each shortened path whether the shortened path traverses a number of non-regenerative nodes which is greater than the predetermined maximum number of non-regenerative nodes, and a regenerative path selector operable to select a regenerated path by choosing a possible path which corresponds to a shortened path determined not to traverse a number of non-regenerative nodes which is greater than the predetermined maximum number of non-regenerative nodes, the regenerated path being provisioned to include a regeneration at the node corresponding to the end node of the shortened path, and the regenerative path selector being further operable to output the selected regenerative path.

The invention may in a second aspect, provide a network manager for a photonic network comprising an non-regenerative node counter operable to determine for each of a plurality of possible paths through the network between a first and second node in the network, whether the respective path traverses a number of non-regenerative nodes which is greater than a predetermined maximum number of non-regenerative nodes, a non-regenerative path selector operable to select a path from set of paths which have been determined not to traverse a number of non-regenerative nodes which is greater than the said maximum number of non-regenerative nodes, and to output the selected path, a path rejecter operable to reject any paths which are determined to traverse a number of non-regenerative nodes which is greater than the said maximum non-regenerative node value and which do not traverse regenerative nodes, a path shortener operable to generate for each possible path, a set of shortened paths, each shortened path passing between the said first node and a regenerative node in the respective possible path, the non-regenerative node counter being further operable to determine for each shortened path whether the shortened path traverses a number of non-regenerative nodes which is greater than the predetermined maximum number of non-regenerative nodes, and a regenerative path selector operable to select a regenerated path by choosing a possible path which corresponds to a shortened path determined not to traverse a number of non-regenerative nodes which is greater than the predetermined maximum number of non-regenerative nodes, the regenerated path being provisioned to include a regeneration at the node corresponding to the end node of the respective shortened path, and the regenerative path selector being further operable to output the selected regenerative path.

In another aspect, the invention provides a method of selecting a route through a photonic network comprising selecting nodes in the route based on the signal degradation between optical regenerators in the route. The signal degradation may be measured by counting non-regenerative nodes. Alternatively or additionally, measurements of the signal may be made such as BER or noise, and the measurement may be compared with a threshold beyond which provisioning of regeneration in the route is considered necessary. The measurements may be made, for example, using the techniques disclosed in Nortel Networks co-pending U.S. patent application "Optical Networks with Signal Regeneration", (Nortel reference 12947D) which was filed on Dec. 6, 2000.

In a further aspect of the invention there is provided a method of selecting a wavelength route between a first and a second node in a photonic network comprising the steps of determining for each of a plurality of possible paths between the first and second nodes, whether the respective path traverses a number of non-regenerative nodes which is greater than a predetermined maximum number of non-regenerative nodes, for the set of possible paths determined not to traverse a number of non-regenerative nodes which is greater than the said maximum number of non-regenerative nodes, selecting a non-regenerated path from the set, if all possible paths are determined to traverse a number of non-regenerative nodes which is greater than the said maximum non-regenerative node value, rejecting any paths which do not traverse regenerative nodes, generating for each possible path, a set of shortened paths, each shortened path passing between the said first node and a regenerative node in the respective possible path and determining for each shortened path whether the shortened path traverses a number of non-regenerative nodes which is greater then the predetermined maximum number of non-regenerative nodes, for any shortened paths determined not to traverse a number of non-regenerative nodes which is greater than the said maximum number of non-regenerative nodes, selecting a regenerative path by choosing a possible path which corresponds to such a shortened path and which is provisioned to induce a regeneration at the node corresponding to the end node of the respective shortened path.

This method quickly rejects paths which have no hope of being suitable either because there are too many non-regenerative nodes (such as amplifiers) and no possibility of regeneration or because the regenerative nodes (such as OXCs) are too widely spaced apart in the path.

This basic algorithm will select a path which has sufficient regenerations or will indicate that no such paths are possible. However, it is desirable to attempt to reduce the number of regenerations by ensuring that the path traverses as many amplifiers as possible before being regenerated. This could be considered to be an optimum path.

Algorithms are known (for example, the modified Dijkstra (R Bhandari, Proceedings, IEEE info com 1498-1508, 1994) which are able to calculate a "shortest" path between two points and a network. The algorithm operates using parameters representing link "cost" between each node. The cost or "length" may be weighted to favour particular links. Initially, for example the "cost" may be directly related to the physical length between the nodes. However it may be operationally expedient to adjust the length or costs of the links in order to control provisioning of paths across those nodes forming the ends of those links.

For situations in which the algorithm determines that no regeneration is necessary, the path may be provisioned based simply on link cost in the normal way.

However, for paths for which regeneration is required, the algorithm ideally operates to ensure that paths having few non-regenerative nodes between the regenerative nodes are less favoured than paths which have more non-regenerative nodes between the regenerative nodes. This may be achieved in accordance with the invention by reversing the sign of the link cost for each link in each shortened path which has been determined not to traverse a number of non-regenerative nodes which is greater than the said maximum number of non-regenerative nodes and using the reverse sign value selecting the shortest path between the first and second node. The modified Dijkstra algorithm for example can operate with negative link cost value.

In this way, a path having a long "shortened path" i.e. a long distance between regenerative nodes, will appear to "cost" less than that having a small number of non-regenerative nodes. This is because, as explained below, the long shortened path once the sign of its link costs is reversed, has a very low value relative to a shorter "shortened path".

In another aspect, the invention provides a node in a photonic network forming part of a wavelength routing path between a first and second node in the network, the node having been selected by determining for each of a plurality of possible paths between the first and second nodes, whether the respective path traverses a number of non-regenerative nodes which is greater than a predetermined maximum number of non-regenerative nodes, for the set of possible paths determined not to traverse a number of non-regenerative nodes which is greater than the said maximum number of non-regenerative nodes, selecting the node as part of a non-regenerated path from the set if all possible paths are determined to traverse a number of non-regenerative which is greater than the said maximum non-regenerative node value, rejecting any paths which do not traverse regenerative nodes, generating for each possible path, a set of shortened paths, each shortened path passing between the said first node and a regenerative node in the respective possible path and determining for each shortened path whether the shortened path traverses a number of non-regenerative nodes which is greater than the predetermined maximum number of non-regenerative nodes, for any shortened paths determined not to traverse a number of non-regenerative nodes which is greater than the said maximum number of non-regenerative nodes, selecting the nod as part of a regenerated path by choosing a possible path which corresponds to such a shortened path and which is provisioned to include a regeneration at the node corresponding to the end node of the respective shortened path.

In other aspects, the invention provides a computer program which when executed on hardware associated with a photonic network, causes the hardware to determine for each of a plurality of possible paths between first and second nodes in network, whether the respective path traverses a number of non-regenerative nodes which is greater than a predetermined maximum number of non-regenerative nodes, for the set of possible paths determined not to traverse a number of non-regenerative nodes which is greater than the said maximum number of non-regenerative nodes, select a non-regenerated path from the set, if all possible paths are determined to traverse a number of non-regenerative nodes which is greater than the said maximum non-regenerative node value, reject any paths which do not traverse regenerative nodes, generating for each possible path, a set of shortened paths, each shortened path passing between the said first node and a regenerative node in the respective possible path and determining for each shortened path whether the shortened path traverses a number of non-regenerative nodes which is greater than the predetermined maximum number of non-regenerative nodes, for any shortened paths determine not to traverse a number of non-regenerative nodes which is greater than the said maximum number of non-regenerative nodes, select a regenerated path by choosing a possible path which corresponds to such a shortened path and which is provisioned to include a regeneration at the node corresponding to the end node of the respective shortened path and/or a switch communications network a switched communications network operable to determine for each of a plurality of possible paths between first and second nodes in the network, whether the respective path traverses a number of non-regenerative nodes which is greater than a predetermined maximum number of non-regenerative nodes, for the set of possible paths determined not to traverse a number of non-regenerative nodes which is greater than the said maximum number of non-regenerative nodes, select a non-regenerated path from the set, if all possible paths are determined to traverse a number of non-regenerative nodes which is greater than the said maximum non-regenerative node value, reject any paths which do not traverse regenerative nodes, generating for each possible path, a set of shortened paths, each shortened path passing between the said first node and a regenerative node in the respective possible path and determining for each shortened path whether the shortened path traverses a number of non-regenerative nodes which is greater than the predetermined maximum number of non-regenerative nodes, for any shortened paths determined not to traverse a number of non-regenerative nodes which is greater than the said maximum number of non-regenerative nodes, select a regenerated path by choosing a possible path which corresponds to such a shortened path and which is provisioned to include a regeneration at the node corresponding to the end node of the respective shortened path.

Other aspects and features of the present invention will become apparent to those ordinarily skilled in the art upon review of the following description of specific embodiments of the invention in conjunction with the accompanying figures.

In the invention described herein, regenerative nodes are taken to mean nodes which have the capability of regenerating a signal passing through them but which may not be used for that purpose. For example a node may be a combined photonic cross-connect and optical cross-connect. By provisioning a route through the photonic cross-connect which is optically transparent and does not involve an OEO conversion, costs are reduced. However, using the algorithm it may be determined that regeneration is required and in this case the same node may be used but the route may be provisioned through the optical cross-connect function of the node. It will also be appreciated that "optical regeneration" is possible in which regeneration occurs entirely in the optical domain. This invention is equally applicable to this type of regeneration since it is still desirable to reduce the number of such regenerations which are required.

A "non-regenerative" node is taken to mean any network node (e.g. an amplifier) which has no regenerative capability.

DETAILED DESCRIPTION OF PREFERRED EMBODIMENT

Figure 1:
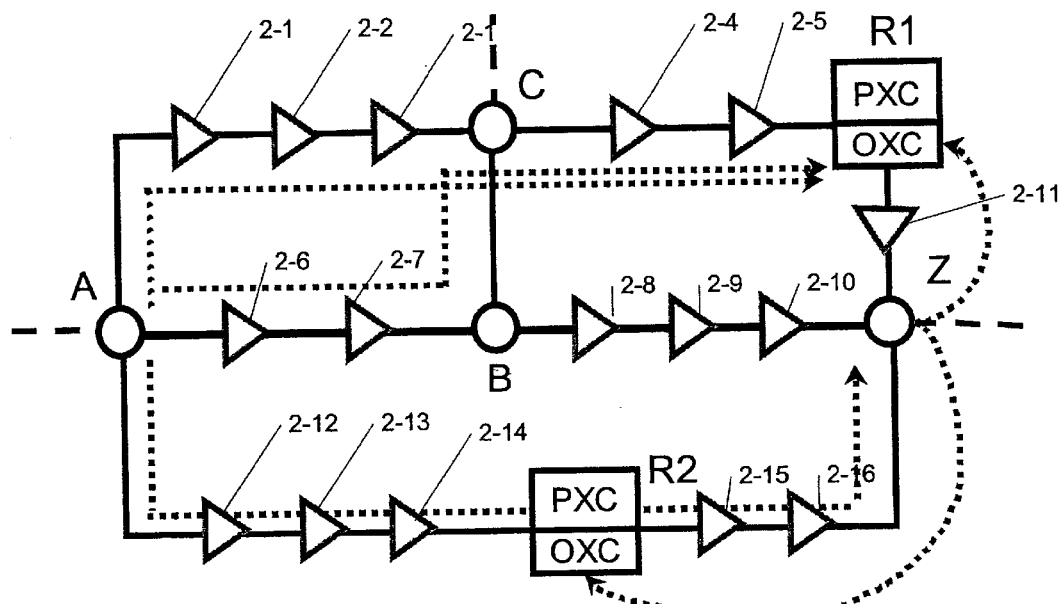
FIG. 1 is a schematic block diagram of a photonic mesh network.

With reference to FIG. 1, an exemplary photonic network has nodes ABC and Z, amplifiers 2-1 to 2-16 and cross-connects R1 and R2.

In order to illustrate the technique of the present invention, it is assumed that a path can traverse no more than four amplifiers before regeneration is required. Thus, considering a path commencing at node A and terminating at node, Z, there are four possible routes. The routes are AECZ, ABZ, AZ and ACZ. It will be noted that the first three of these paths contain five amplifiers and the fourth path has six amplifiers. Thus none of these paths are suitable for use without regeneration occurring.

Figure 2:
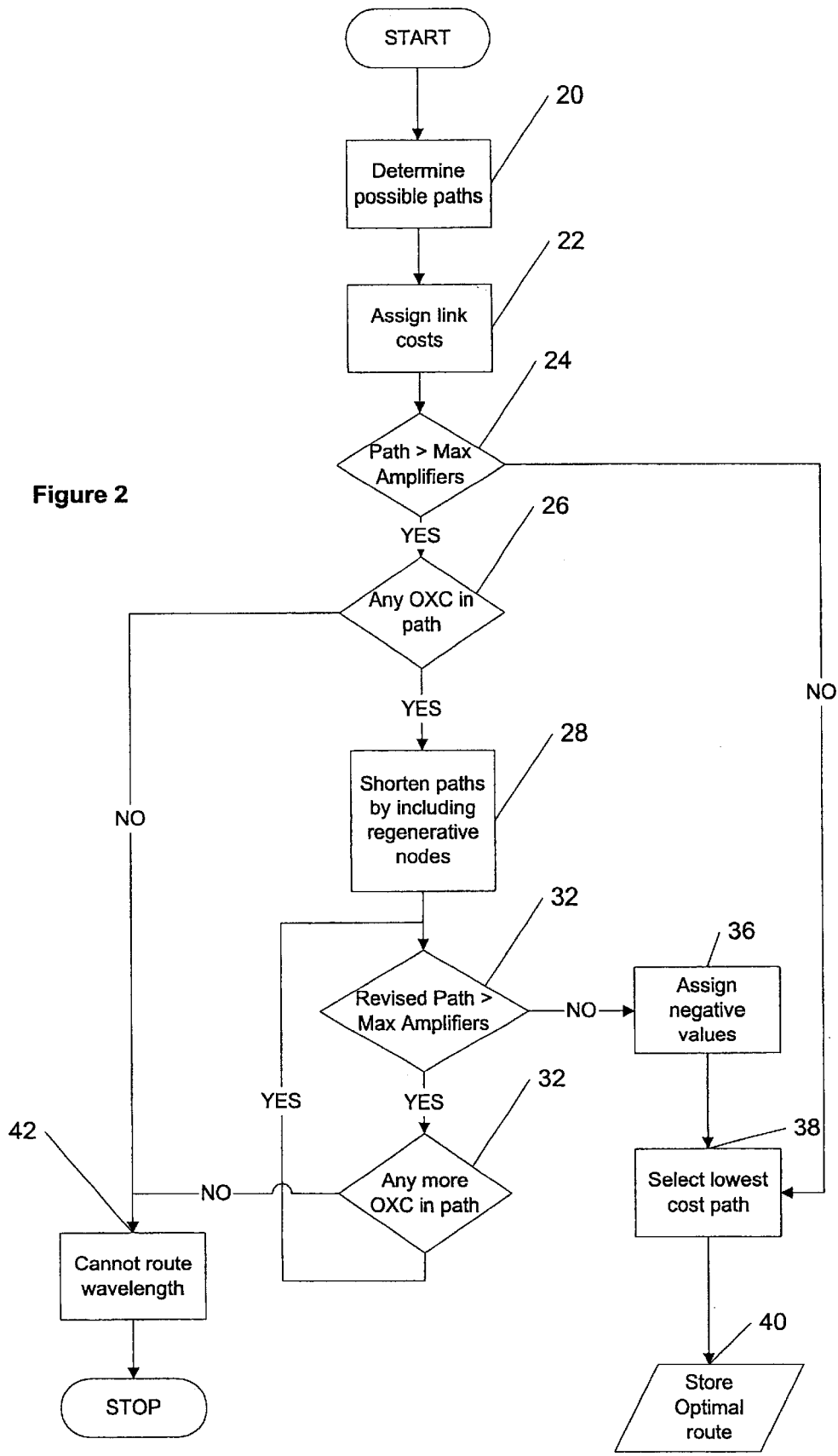
FIG. 2 is a schematic block diagram of a network configuration tool for a photonic network.

With reference also to FIG. 2, having determined the possible paths through the network between the first and second nodes (A and Z) in step 20 of flow chart of FIG. 2, each of the links i.e. the link from node A to amplifier 2-1, the link between amplifier 2-1 and amplifier 2-2 and so on is assigned a link cost. This typically will be related to the length of the link but may also include weighting factors to cause certain links to be more favoured by the algorithm than other links. This is carried out in step 22 of the flow chart. Thus a routing table may be generated with amplifier costs obtained, for example, through link state advertisements (LSA).

Initially, it is necessary to determine whether each of the paths has more amplifiers than the maximum allowable number of amplifiers (in this case four amplifiers). Thus in the example given above in step 24, since all the paths have five or more amplifiers, the algorithm must continue onto step 26 where it determines whether there are any optical cross-connects (which can perform regeneration) are in the path.

If there are paths which have four or less amplifiers, that path those paths are selected based on the lowest cost path looking at the link costs (step 38). This may be performed for example using the Dijkstra algorithm from the Bhandari paper mentioned above. This route may be considered the optimal route since it does not "cost" any regenerative function provided, for example, by an OXC.

Returning to the example (in which regeneration is necessary), the next step is to "shorten" the paths by analysing the path by replacing the end of the path with one of the regenerative nodes (step 28).

Thus in the example, the path ABCZ is analysed as path ABCR1, the path ABZ must be rejected in step 26 because there are no OXCs in the path, the path AZ is analysed as the path AR2 and the path ACZ is analysed as the path ACR1.

In step 30, these shortened paths are then analysed to determine whether the amplifier numbers in the shortened paths are more than the maximum number of amplifiers.

In this example, the path ABCR1 now has four amplifiers which is acceptable. Similarly the path AZ has three amplifiers which is also acceptable.

However, the path ACZ has five amplifiers and is therefore rejected (step 42) because the regenerative nodes are spaced too widely apart for regeneration to be carried out after a sufficiently low number of amplifiers. Alternatively, the algorithm may loop back to step 28 having found additional regenerative nodes in the path. In this example, however, the path ACZ is a hopeless case because there are no further regenerative nodes.

Thus the algorithm has very quickly and without great complexity discarded paths which are unsuitable (namely paths ABZ and ACZ). The algorithm must now choose the best of the remaining two paths (namely ABCZ and AZ).

From the discussion above, it will be apparent that the best situation is one in which a maximum number of amplifiers is used between regenerative nodes within the nodes, for the set of possible paths determined not to traverse a number constraint that no more than four amplifiers may be used. It Is desirable also to allow the link cost to be factored into the selection. Both these goals may be achieved using the following technique.

Firstly, the shortened paths i.e. those paths between node A and the regenerative node, have the sign of the link costs reversed. This has the effect of making the cost of a path having a large number of amplifiers lower than the cost of a path having a fewer number of amplifiers. By then processing the paths using a shortest path routing algorithm which is able to process negative link cost (such as the Dijkstra algorithm) the shortest (or "least cost") path is found. In this example, we assume that the link cost of each amplifier is 1 and that the cost of photonic switches (ABC and Z) and regenerative nodes is 0. With these values, the path ABCZ has a value of −4+i.e. −3. The path AZ has three amplifiers in the shortened path and two further amplifiers after the regenerative node R2. Thus the total length or cost of this path is only −1 (i.e. −3+1) thus it costs more than the path ABCZ. This is the desired result since the path ABCZ has four amplifiers before the regenerative node whereas the path AZ has only three.

This technique may be scaled to larger networks having many nodes and many more regenerative nodes. It will be appreciated that the algorithm effectively has two stages. In the first stage a low complexity scheme is used to reject the paths which can never be suitable. The algorithm then prepares the remaining paths by adjusting the link costs before analysis by a conventional shortest path routing algorithm. In this way, the speed and complexity of the processing if much reduced since the more complex step of performing shortest path routing is only carried out on paths which are known to be usable in the sense that there is sufficient regenerative capacity in the link (but may not be optimal). The shortest path routing is used simply to choose the optimal route from a set of usable routes.

Figure 3:
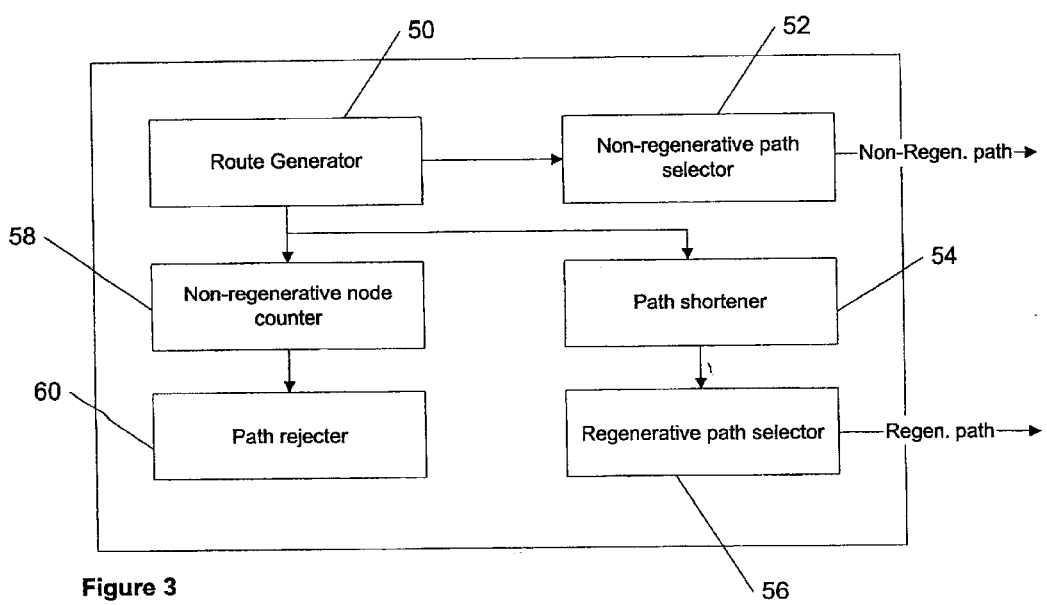
FIG. 3 is a flow chart showing the steps carried out by the network configuration tool.

This technique may be used to provide an agile dynamically reconfigurable network. For example, the algorithm could be incorporated in a network node. Thus with reference to FIG. 3, a node may contain a route generator 50 which generates a list of possible paths between any two nodes in the network. The possible paths may then be analysed to see if any of them have less than the maximum allowable number of non-regenerative nodes. Those paths which do have less than this maximum number are selected by the non-regenerative path generator 52 for further processing by a shortest path routing algorithm. If no such paths are available, then the node shortens the paths using path shortener 54 in the way described above by analysing paths which terminate at a regenerative node. If any of these paths are found to have less than the maximum permissible number of non-regenerative nodes, then they are selected by the regenerative path selector 56 and output for shortest path routing optimisation.

A non-regenerative node counter 58 is used to count the number of non-regenerative nodes. Path rejecter 60 operates to reject paths (see step 42 in the flow chart) which either have too many non-regenerative nodes and no regenerative nodes or have too few regenerative nodes so that it is not possible to avoid the path traversing more than the maximum number of non-regenerative nodes.

Thus this technique allows for dynamic wavelength routing to be optimised in a sparsely regenerated photonic network. By avoiding the need for excessive regeneration, the implementation cost of the network is minimised. The algorithm takes account of conventional link costings and also rapidly rejects paths which are untenable.

What is claimed is:

1. A network configuration tool for selecting a path in a photonic network, the tool comprising:
    (a) a route generator operable to generate a list of possible paths through the network between a first and second node in the network,
    (b) an non-regenerative node counter operable to determine for each of the possible paths whether the respective path traverses a number of non-regenerative nodes which is greater than a predetermined maximum number of non-regenerative nodes,
    (c) a non-regenerative path selector operable to select a path from the set of paths which have been determined not to traverse a number of non-regenerative nodes which is greater than the said maximum number of non-regenerative nodes, and to output the selected path and to cease,
    (d) a path shortener operable to generate for each possible path having a regenerative node, a set of shortened paths, each shortened path passing between the said first node and a regenerative node in the respective possible path, the non-regenerative node counter being further operable to determine for each shortened path whether the shortened path traverses a number of non-regenerative nodes which is greater than the predetermined maximum number of non-regenerative nodes, and
    (e) a regenerative path selector operable to select a regenerated path by choosing a possible path which corresponds to a shortened path determined not to traverse a number of non-regenerative nodes which is greater than the predetermined maximum number of non-regenerative nodes, the regenerated path being provisioned to include a regeneration at the node corresponding to the end node of the respective shortened path, and the regenerative path selector being further operable to output the selected regenerative path.

2. A tool according to claim 1, wherein the non-regenerative path selector is operable to assign a link coat to each link in each possible path in the set and to select the shortest possible path.

3. A tool according to claim 1, wherein the regenerative path selector is operable to reverse the sign of the link cost for each link in each shortened path, and using the reversed sign values, to select the shortest path between the first and second nodes.

4. A method according to claim 1, wherein the step of selecting a non-regenerated path from the set of possible paths, comprises assigning a link cost to each link in each possible path in the set and selecting the shortest possible path.

5. A method according to claim 1, wherein the step of selecting a regenerated path comprises reversing the sign of the link cost for each link in each shortened path which has been determined not to traverse a number of non-regenerative nodes which is greeter than the said maximum number of non-regenerative nodes, and using the reversed sign values, selecting the shortest path between the first and second nodes.

6. A network manager for selecting a path in a photonic network, the network manager comprising:
    (a) a non-regenerative node counter operable to determine for each of a plurality of possible paths through the network between a first and second node in the network, whether the respective path traverses a number of non-regenerative nodes which is greater than a predetermined maximum number of non-regenerative nodes, (b) a non-regenerative path selector operable to select a path from the set of paths which have been determined not to traverse a number of non-regenerative nodes which is greater than the said maximum number of non-regenerative nodes, and to output the selected path, (c) a path shortener operable to generate for each possible path having a regenerative node, a set of shortened paths, each shortened path passing between the said first node and a regenerative node in the respective possible path, the non-regenerative node counter being further operable to determine for each shortened path whether the shortened path traverses a number of non-regenerative nodes which is greater than the predetermined maximum number of non-regenerative nodes, and (d) a regenerative path selector operable to select a regenerated path by choosing a possible path which corresponds to a shortened path determined not to traverse a number of non-regenerative nodes which is greater than the predetermined maximum number of non-regenerative nodes, the regenerated path being provisioned to include a regeneration at the node corresponding to the end node of the respective shortened path, and the regenerative path selector being further operable to output the selected regenerative path.

7. A network manager according to claim 6, wherein the non-regenerative path selector is operable to assign a link cost to each link in each possible path in the set and to select the shortest possible path.

8. A network manager to claim 6, wherein the regenerative path selector is operable to reverse the sign of the link cost for each link in each shortened path, and using the reversed sign values, to select the shortest path between the first and second nodes.

9. A node according to claim 6, wherein the step of selecting the node as part of a non-regenerated path from the set of possible paths, comprises assigning a link cost to each link in each possible path in the set and selecting the shortest possible path.

10. A node according to claim 6, wherein the step of selecting the node as part of a regenerated path comprises reversing the sign of the link cost for each link in each shortened path which has been determined not to traverse a number of non-regenerative nodes which is greater than the said maximum number of non-regenerative nodes, and using the reversed sign values, selecting the shortest path between the first and second nodes.

11. A method of selecting a wavelength route between a first and a second node in a photonic network comprising the steps of:

(a) determining for each of a plurality of possible paths between the first and second nodes, whether the respective path traverses a number of non-regenerative nodes which is greater than a predetermined maximum number of non-regenerative nodes, (b) for the set of possible paths determined not to traverse a number of non-regenerative nodes which is greater than the said maximum number of non-regenerative nodes, selecting a non-regenerated path from the set, (c) if all possible paths are determined to traverse a number of non-regenerative nodes which is greater than the said maximum non-regenerative node value, generating for each possible path having a regenerative node, a set of shortened paths, each shortened path passing between the said first node and a regenerative node in the respective possible path and determining for each shortened path whether the shortened path traverses a number of non-regenerative nodes which is greater than the predetermined maximum number of non-regenerative nodes, (d) for any shortened paths determined not to traverse a number of non-regenerative nodes which is greater than the said maximum number of non-regenerative nodes, selecting a regenerated path by choosing a possible path which corresponds to such a shortened path and which is provisioned to includes regeneration at the node corresponding to the end node of the respective shortened path.

12. A method of selecting a node in a photonic network forming part of a wavelength routing path between a first and second node in network, the node having been selected by:

(a) determining for each of a plurality of possible paths between the first and second nodes, whether the respective path traverses a number of non-regenerative nodes which is greater than a predetermined maximum number of non-regenerative nodes, (b) for the set of possible paths determined not to traverse a number of non-regenerative nodes which is greater than the said maximum number of non-regenerative nodes, selecting the node as part of a non-regenerated path from the set, (c) if all possible paths are determined to traverse a number of non-regenerative nodes which is greater than the said maximum non-regenerative node value, rejecting any paths which do not traverse regenerative nodes, generating for each possible path, a set of shortened paths, each shortened path passing between the said first node and a regenerative node in the respective possible path and determining for each shortened path whether the shortened path traverses a number of non-regenerative nodes which is greater than the predetermined maximum number of non-regenerative nodes, (d) for any shortened paths determined not to traverse a number of non-regenerative nodes which is greater than the said maximum number of non-regenerative nodes, selecting the node as part of a regenerated path by choosing a possible path which corresponds to such a shortened path and which is provisioned to include a regeneration at the node corresponding to the end node of the respective shortened path.

13. A computer program on a computer readable medium which when executed on hardware associated with a photonic network, causes the hardware to:

(a) determine for each of a plurality of possible paths between first and second nodes in the network, whether the respective path traverses a number of non-regenerative nodes which is greater than a predetermined maximum number of non-regenerative nodes, (b) for the set of possible paths determined not to traverse a number of non-regenerative nodes which is greater than the said maximum number of non-regenerative nodes, select a non-regenerated path from the set, (c) if all possible paths are determined to traverse a number of non-regenerative nodes which is greater than the said maximum non-regenerative node value, generating for each possible path having a regenerative node, a set of shortened paths, each shortened path passing between the said first nods and a regenerative node in the respective possible path and determining for each shortened path whether the shortened path traverses a number of non-regenerative nodes which is greater than the predetermined maximum number of non-regenerative nodes, (d) for any shortened paths determined not to traverse a number of non-regenerative node which is greater than the said maximum number of non-regenerative nodes, select a regenerated path by choosing a possible path which corresponds to such a shortened path and which is provisioned to include a regeneration at the node corresponding to the end node of the respective shortened path.

14. A method of selecting a path in a switched communication network, the method comprising:

(a) determine for each of a plurality of possible paths between first and second nodes in the network, whether the respective path traverses a number of non-regenerative nodes which is greater than a predetermined maximum number of non-regenerative nodes, (b) for the set of possible paths determined not to traverse a number of non-regenerative nodes which is greater than the said maximum number of non-regenerative nodes, select a non-regenerated path from the set, (c) if all possible paths are determined to traverse a number of non-regenerative nodes which is greater than the said maximum non-regenerative node value, generating for each possible path having a regenerative node, a set of shortened paths, each shortened path passing between the said first node and, regenerative node in the respective possible path and determining for each shortened path whether the shortened path traverses a number of non-regenerative nodes which is greater than the predetermined maximum number of non-regenerative nodes, (d) for any shortened paths determined not to traverse a number of non-regenerative nodes which is greater than the said maximum number of non-regenerative nodes, select a regenerated path by choosing a possible path which corresponds to such a shortened path and which is provisioned to include a regeneration at the node corresponding to the end node or the respective shortened path.

* * * * *